United States Patent [19]
Pajela et al.

[11] Patent Number: 6,142,564
[45] Date of Patent: Nov. 7, 2000

[54] REARWARD MOVING SEAT WITH BREAKAWAY LATCH

[75] Inventors: Juede P. Pajela, Gilbert; Cris C. Cabral; Kevin M. Brown, both of Mesa; Albert N. Felix, Phoenix, all of Ariz.

[73] Assignee: TRW Inc., Lyndhurst, Ohio

[21] Appl. No.: 09/522,933

[22] Filed: Mar. 10, 2000

[51] Int. Cl.$^7$ ...................................................... B60N 2/42
[52] U.S. Cl. ................... 297/216.18; 297/216.19
[58] Field of Search ........................... 297/216.1, 216.16, 297/216.18, 216.19, 344.1; 296/65.01; 248/429

[56] References Cited

U.S. PATENT DOCUMENTS 2,900,036  8/1959  Blake .
3,992,046  11/1976  Braess .
4,738,485  4/1988  Rumpf .
5,167,421  12/1992  Yunzhao .
5,344,204  9/1994  Yunzhao .

FOREIGN PATENT DOCUMENTS 94022692  10/1994  WIPO ............................... 297/216.18

*Primary Examiner*—Milton Nelson, Jr.
*Attorney, Agent, or Firm*—Tarolli, Sundheim, Covell, Tummino & Szabo L.L.P.

[57] ABSTRACT

A vehicle occupant safety apparatus (10) includes a seat (11) for a vehicle occupant. The seat (11) has a forward position in the vehicle and a rearward position in the vehicle. A support (20) for the seat (11) enables the seat to move on the support from the forward position to the rearward position in the vehicle. A break-away seat latch (41) maintains the seat (11) in the forward position. An actuator (45), when actuated, breaks the latch (41) and moves the seat (11) from the forward position to the rearward position.

8 Claims, 2 Drawing Sheets

REARWARD MOVING SEAT WITH BREAKAWAY LATCH

FIELD OF THE INVENTION

This invention relates to a vehicle occupant protection system and, more particularly, to a vehicle seat that moves to help protect a vehicle occupant during a frontal vehicle collision.

BACKGROUND OF THE INVENTION

A variety of systems have been devised for vehicle occupant protection. The most commonly employed systems have belts or harnesses to fasten about vehicle occupants, as well as inflatable air bags. These systems help to control occupant motion and absorb the occupants's kinetic energy during a vehicle collision.

Both upper and lower body protection can be achieved by purely "passive" systems. "Passive" refers to the fact that the occupant does not have any active participation in the actuation or application of the protection system. "Passive" systems include automatically applied seat belts and automatically actuated air bags and knee bolsters. One such passive protection system includes an air bag to help protect the upper torso and head of a vehicle occupant and a knee bolster to provide lower body restraint.

SUMMARY OF THE INVENTION

In accordance with the present invention, a vehicle occupant protection apparatus includes a seat for a vehicle occupant, a support for the seat, a break-away seat latch, and an actuator. The seat has a forward position in the vehicle and a rearward position in the vehicle. The support for the seat enables the seat to slide on the support from the forward position to the rearward position in the vehicle. The break-away seat latch maintains the seat in the forward position in the vehicle. The actuator, when actuated, breaks the seat latch and moves the seat from the forward position to the rearward position.

A sensor detects a frontal vehicle collision and actuates the actuator in response to detecting the collision. Therefore, the occupant protection apparatus is a "passive" apparatus requiring no occupant participation in actuating the apparatus.

BRIEF DESCRIPTION OF THE DRAWINGS

The foregoing and other features of the present invention will become apparent to one skilled in the art upon reading the following description of the invention with reference to the accompanying drawings, in which.

Description of a Preferred Embodiment

Figure 1:
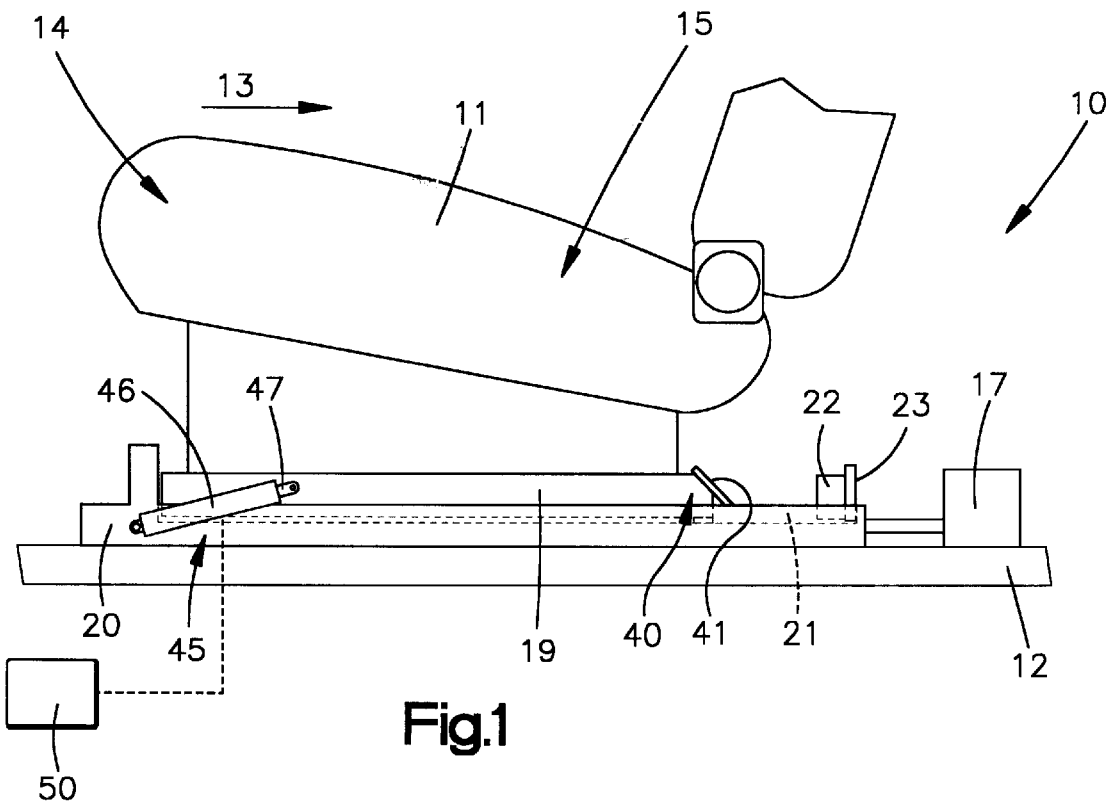
FIG. 1 is a schematic view of an apparatus embodying the present invention and illustrating a seat in one position.
Figure 2:
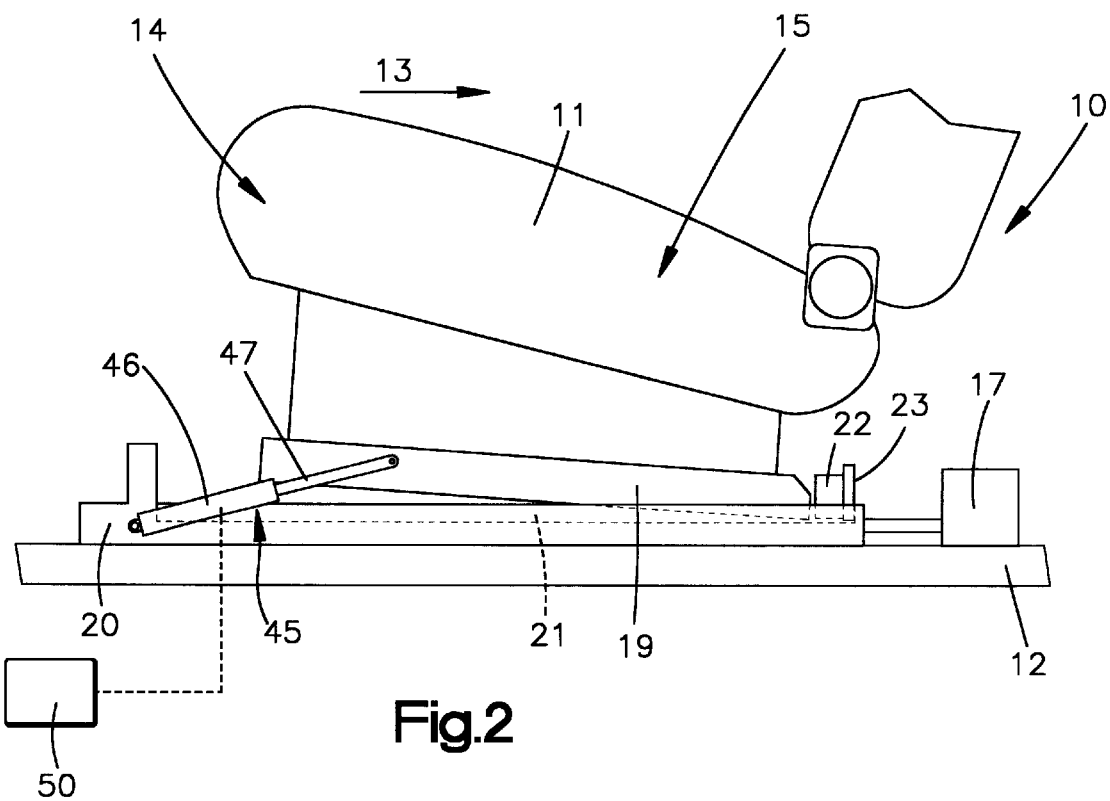
FIG. 2 is a schematic view of the apparatus of FIG. 1 illustrating the seat in a different position.
Figure 3:
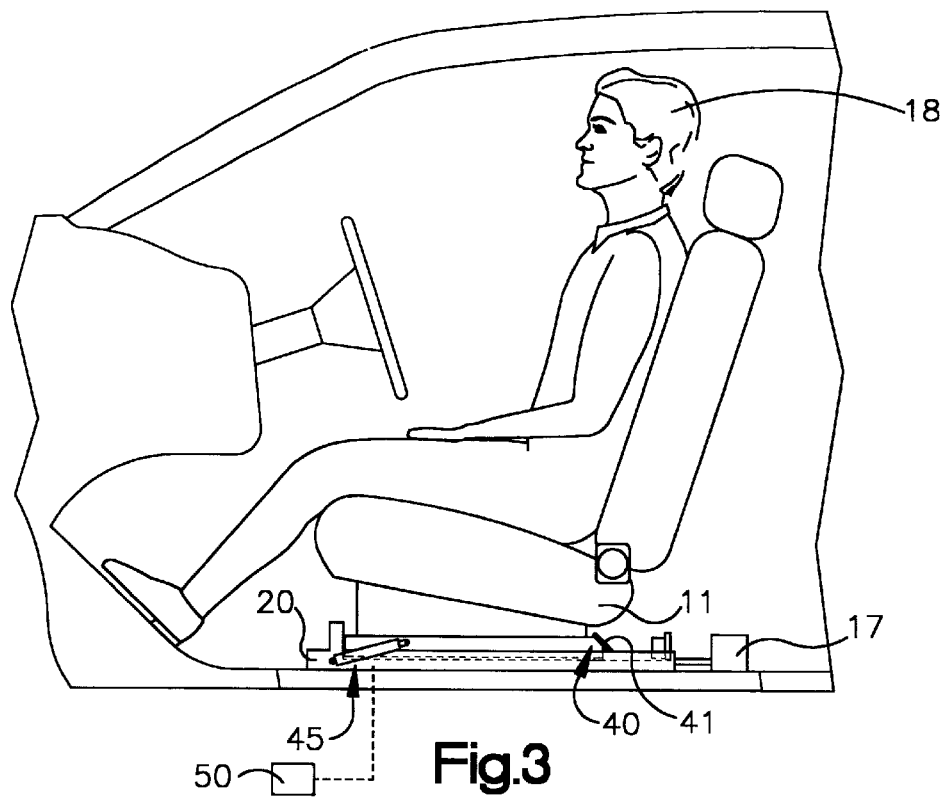
FIGS. 3 and 4 are schematic views illustrating a vehicle occupant seated in a vehicle seat in different positions of the seat.
Figure 4:
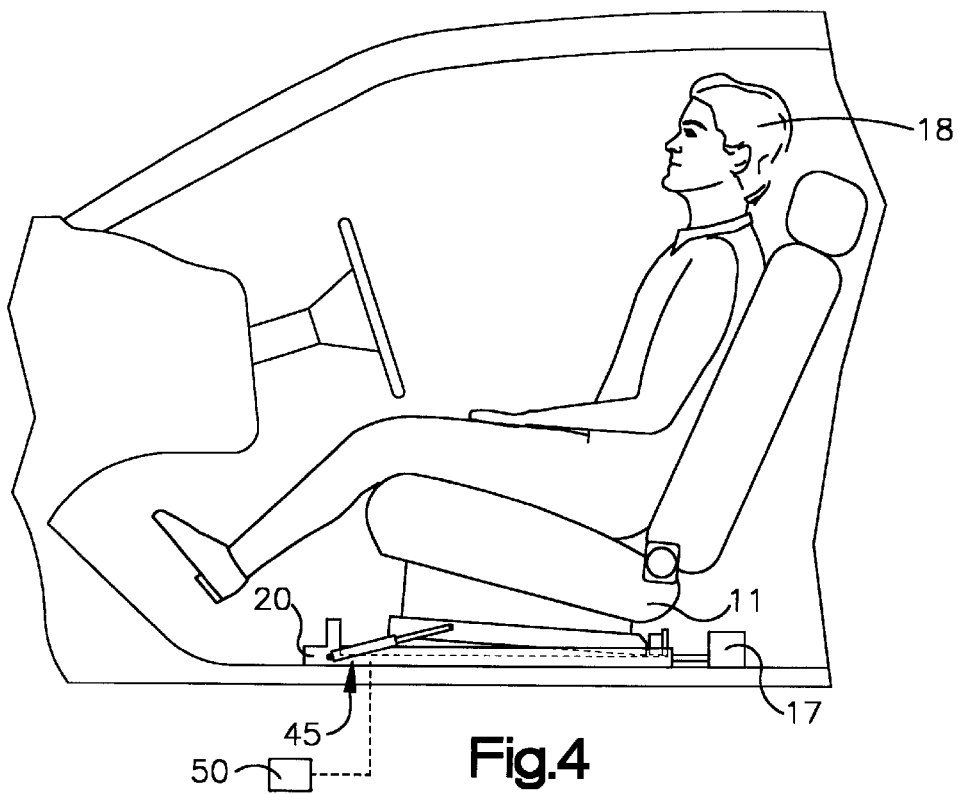

In accordance with the present invention, as viewed in FIGS. 1 and 2, an apparatus 10 includes a seat 11 for an occupant 18 (FIG. 3) of a vehicle 12. The apparatus also includes a support 20 for the seat 11, a break-away seat latch 40, a sensor 50 for detecting a vehicle collision, and an actuator 45 connected to the support 20 and actuated by the sensor 50.

The seat 11 has a pair of rail members 19 (only one is shown in the drawings). The rail members 19 slidingly engage the support 20 and slide relative to the support 20 in the direction of arrow 13 (FIG. 1). The support 20 is attached to the vehicle 12 and includes two guide tracks 21 (only one is shown), which engage the rails 19. The rails 19 slide on the guide tracks 21 when the actuator 45 is actuated.

The seat 11 has a forward position (FIG. 1) in the vehicle 12 and a rearward position (FIG. 2) in the vehicle 12. The seat 11 also has a front portion 14 located forwardly in a vehicle 12 and a rear portion 15 located rearwardly in the vehicle 12. The seat 11 and rail members 19 move on the guide tracks 21 from the forward position to the rearward position in the vehicle 12 during a frontal vehicle collision.

The actuator 45 comprises a source of compressed gas (not shown), a cylinder 46, and a piston rod 47. The piston rod 47 is telescoped into the cylinder 46, as shown in FIG. 1, when the actuator 45 is not actuated. When the actuator 45 is actuated by the sensor 50, the source of compressed gas directs gas into the cylinder 46, which forces the piston rod 47 to move linearly relative to the cylinder 46 to the position shown in FIG. 2. As it moves relative to the cylinder 46, the piston rod 47 applies a force to the seat 11 near the front portion 14 of the seat 11. The force raises the front of the seat and moves the seat 11 from the forward position (FIG. 1) to the rearward position (FIG. 2). The actuator 45 is preferably activated by the sensor 50 detecting a frontal impact to the vehicle of the equivalent of at least a 25 miles per hour barrier crash.

The break-away seat latch 40 holds the seat 11 in the forward position of FIG. 1 prior to actuation of the actuator 45. The break-away seat latch 40 includes a frangible part 41 that is fixed to the support 20 and engages the rearward end of at least one rail 19. The part 41 blocks movement of the rail 19 relative to the support 20 in the direction 13, and thus blocks movement of the seat 11 in the direction 13. The frangible part 41 breaks upon actuation of the actuator 45. The frangible part 41 breaks due to the force applied by the actuator 45 to the seat rail 19 that is engaged by the frangible part 41. When the frangible part 41 breaks, the rail 19 is released for rearward movement and moves rearwardly relative to the support 20, and the seat 11 moves from the forward position to the rearward position.

A rearward stop 22 determines the location of the rearward limit position of the rail members 19 on the support 20. The stop 22 is located in the path of movement of at least one of the rail members 19 when the rail members 19 are moved by actuator 45. When a rail member 19 engages the stop 22, rearward movement of the seat 11 is terminated. The stop 22 is fixed to the support 20 in a manner such that the force of the actuator 45 is overcome by the stop 22.

A suitable means 23 for adjusting the location of the rearward stop 22 on the support 20 enables the rearward position of the seat 11 due to actuation of the actuator 45 to be changed. The means 23 may be any suitable structure, such as a solenoid or a motor and drive.

The travel distance of the seat 11 between the forward position and the rearward position is typically about three inches. The rearward stop 22 may be moved to vary the travel distance for tailoring the movement of the seat to occupants of different heights or various crash criteria.

Furthermore, the seat 11, rail members 19, support 20, actuator 45, break-away latch 40 and stop 22 are adjustably connected to the vehicle 12. A means 17, such as a motor and drive, adjusts the location of the seat 11, rail members 19, support 20, actuator 45, break-away latch 40 and stop 22 in the vehicle for occupants of different heights. The adjustment occurs by actuation of the means 17, which, when actuated, moves the seat 11, rail members 19, support 20, actuator 45, break-away latch 40 and stop 22 forward or rearward in the vehicle.

The vehicle 12 may include, in addition to the apparatus 10, other vehicle occupant protection apparatuses, such as air bags and seat belts (not shown). An air bag that inflates from the instrument panel or steering wheel, for example, would inflate toward a vehicle occupant as the seat in which the occupant is seated moves away from the instrument panel or steering wheel due to actuation of the actuator 45.

From the above description of the invention, those skilled in the art will perceive improvements, changes and modifications. Such improvements, changes and modifications within the skill of the art are intended to be covered by the appended claims.

Having described the invention, the following is claimed:

1. A vehicle occupant safety apparatus comprising:

a seat for a vehicle occupant, said seat having a forward position in the vehicle and a rearward position in the vehicle;

a support for said seat enabling said seat to move on said support from said forward position to said rearward position in the vehicle;

a break-away seat latch to maintain said seat in said forward position; and an actuator for, when actuated, breaking said latch and moving said seat from said forward position to said rearward position.

2. The apparatus as defined in claim 1 further including a sensor for detecting a frontal vehicle collision and actuating said actuator in response to detecting said collision.

3. The apparatus as defined in claim 1 further including a rearward stop against which said seat is moved by said actuator and which determines said rearward position.

4. The apparatus as defined in claim 1 wherein said seat includes a rail member, said rail member sliding on said support from said forward position to said rearward position.

5. The apparatus as defined in claim 1 wherein said breakaway latch includes a frangible portion that fractures upon actuation of said actuator.

6. The apparatus as defined in claim 1 wherein the travel distance of said seat between said forward position and said rearward position on said support is about three inches.

7. The apparatus as defined in claim 1 wherein said actuator comprises a cylinder member and a rod member, one of said members being connected to said support, the other of said members being connected to said seat.

8. The apparatus as defined in claim 1 further including a mechanism, separate and apart from said actuator, for adjusting the position of said support forwardly and rearwardly in the vehicle for occupants of different heights.

* * * * *